United States Patent [19]

Krampera

[11] Patent Number: 5,228,756
[45] Date of Patent: Jul. 20, 1993

[54] RIM FOR A SPOKED BICYCLE REAR WHEEL

[76] Inventor: Jiri Krampera, Bertastrasse 34, 8003 Zürich, Switzerland

[21] Appl. No.: 838,412
[22] PCT Filed: Jul. 8, 1991
[86] PCT No.: PCT/CH91/00146
  § 371 Date: Mar. 10, 1992
  § 102(e) Date: Mar. 10, 1992
[87] PCT Pub. No.: WO92/01574
  PCT Pub. Date: Feb. 6, 1992

[30] Foreign Application Priority Data
Jul. 25, 1990 [CH] Switzerland .......... 02463/90

[51] Int. Cl.⁵ .................................. B60B 1/04
[52] U.S. Cl. ............................ 301/58; 301/95
[58] Field of Search ............ 301/55, 56, 57, 58, 301/59, 60, 95–100, 104; 29/446, 894, 894.33, 894.35, 894.351

[56] References Cited

U.S. PATENT DOCUMENTS 2,937,905  5/1960  Altenburger ............... 301/58
4,531,754  7/1985  Engleman ................. 280/261

FOREIGN PATENT DOCUMENTS 540433   5/1931   Fed. Rep. of Germany.
8912606.8 2/1990  Fed. Rep. of Germany.
628057  10/1927   France.
818460   2/1937   France.
1128981  1/1957   France.
2387802 11/1978   France.
8503405  7/1987   Netherlands ........... 301/60
4423    of 1910   United Kingdom ...... 301/56
2065572  7/1981   United Kingdom.

*Primary Examiner*—Russell D. Stormer
*Attorney, Agent, or Firm*—Walter C. Farley

[57] ABSTRACT

A rim for a spoked bicycle rear wheel has rim holes laterally displaced by an amount (E) from an axis passing through the center of the cross-section of the rim. Such a rim can be subject to undesired tilting under stress imposed by spokes connected between the rim and the wheel hub and placed under tension. The rim side containing the spoke nipples is more highly loaded. To bring about balance of the tensions on both rim sides, the rim cross-section has an asymmetrical shape so that there is more rim material on the more highly loaded side and so that that side is also stiffer. The compressive forces in the rim material are better balanced, making it possible to use less expensive, conventional materials.

19 Claims, 4 Drawing Sheets

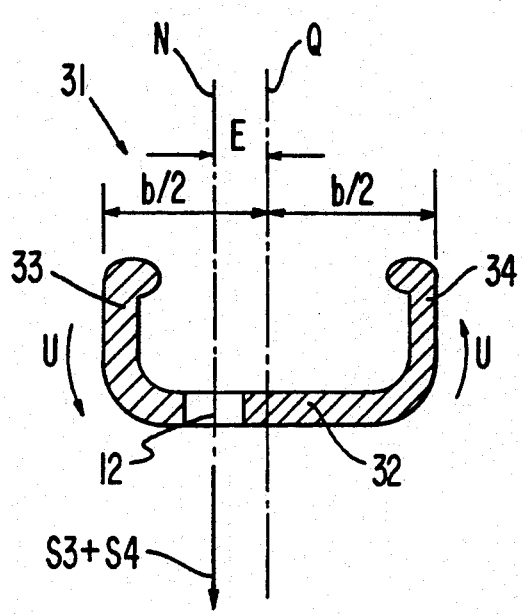
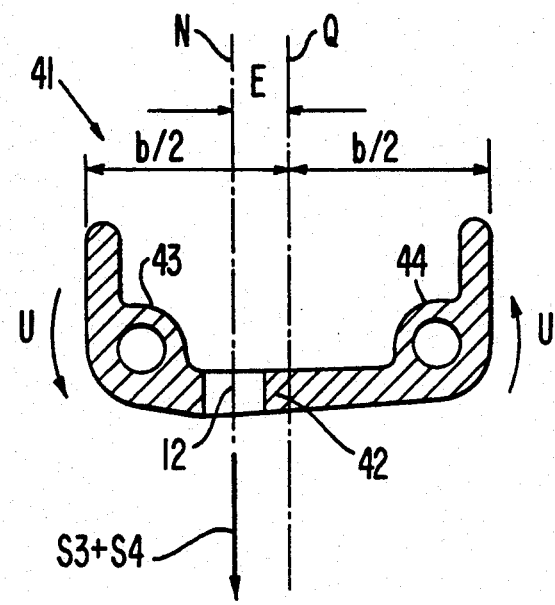
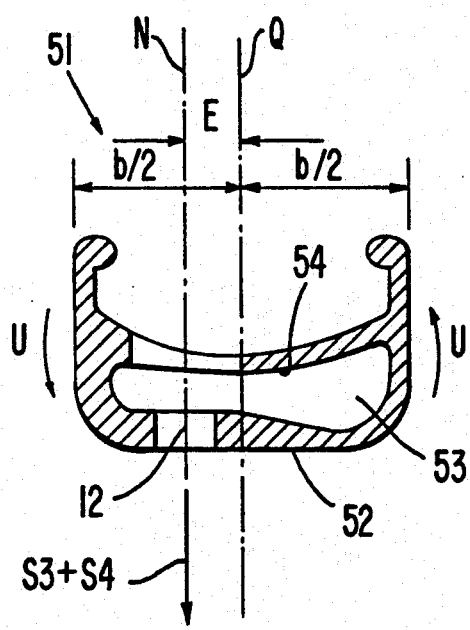
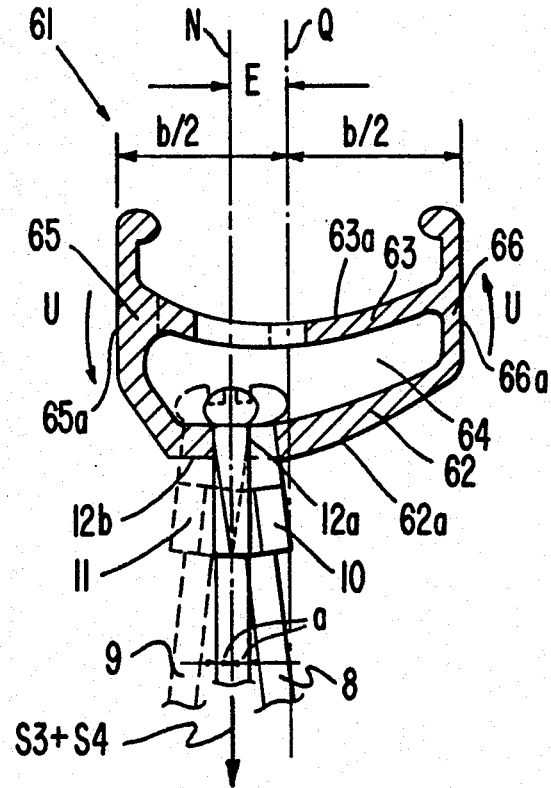

RIM FOR A SPOKED BICYCLE REAR WHEEL

FIELD OF THE INVENTION

This invention relates to a bicycle rim for spoked bicycle rear wheels.

BACKGROUND OF THE INVENTION

A conventional bicycle rear wheel comprises a rear wheel hub to one side of which is fitted a set of sprockets for a driving chain. Hub flanges on either side of the hub are connected by wire spokes under tension with a conventional tire-carrying rim. The rear wheel rim is the same as is used on the front wheel of the bicycle in question.

The presence of the sprocket set in a conventional rear wheel leads to an undesired lateral displacement of the center plane of both hub flanges from the rim center plane toward the opposite side from the sprocket. As a result of this roughly 5 to 10 mm displacement, which is known as the amount of dish, the tension on the sprocket-side spokes is greater than that of the spokes on the side away from the sprocket to an extent which greatly reduces the stability of the rear wheel. This is the most important problem with bicycle rear wheels and it has been known for decades. It is therefore desirable to bring about an optimum balance of the spoke tensions on the two rear wheel sides.

French patent application 76 22859 solves this problem by a lateral displacement of the center plane of both hub flanges in rear wheels toward the sprocket side, the rim position in the center plane of the frame being retained. Both hub flanges are then at the same distance from the rim center plane and the spoke tensions on both wheel sides are therefore completely compensated, as is each bicycle front wheel. Wide use of this system has not hitherto been possible due to the necessarily complicated bicycle frame with an asymmetrical rear frame.

Recently, the press has disclosed new and very expensive carbon rims. In the rear wheel rim the high torsional rigidity of the rim profile permits anchoring of the spokes laterally displaced from the rim center toward the sprocket side, unlike the front wheel rim, in which there is conventionally symmetrical anchoring of the spokes. Thus, unlike the aforementioned solution, this measure with respect to the rear wheel only partly balances the unequal spoke tensions on both wheel sides. Nevertheless, a rear wheel equipped with such a rim can be used in any conventional symmetrical bicycle frame. However, it is a vital requirement for this solution that the rim be extremely stiff.

SUMMARY OF THE INVENTION

An object of the present invention is to provide a rim for a bicycle rear wheel which is made from standard, inexpensive material, but which can still withstand the increased stresses and loads associated with the lateral displacement of the spoke anchoring. This object is achieved with a rear wheel rim with laterally displaced rim holes for receiving spoke nipples and with an asymmetrical cross-section with respect to the rim center plane.

BRIEF DESCRIPTION OF THE DRAWINGS

The problem of the bicycle rear wheel using a conventional rim will be explained and then various embodiments of the invention will be described in detail with reference to the accompanying drawings wherein:

FIGS. 7-11 are transverse sectional views of additional embodiments of rims according to the invention, FIG. 11 being taken along the line I—I of FIG. 12;

DESCRIPTION OF THE PREFERRED EMBODIMENTS

Figure 1:
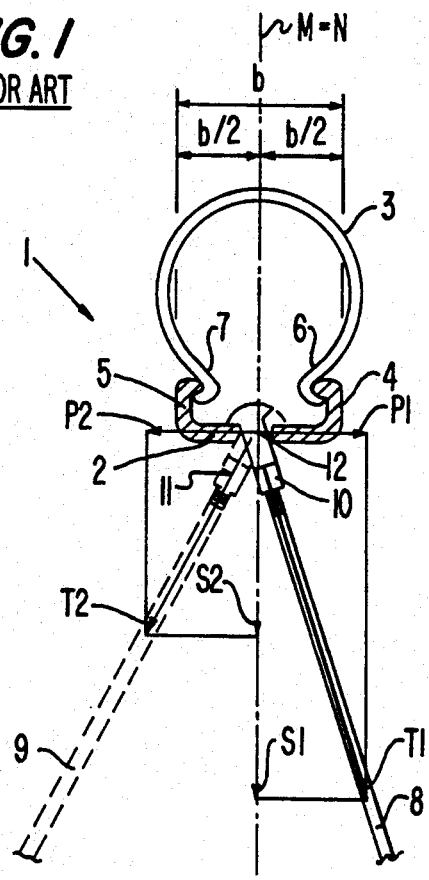
FIG. 1 is a transverse sectional view of a conventional bicycle rim with symmetrical spoke anchoring according to the prior art.

FIG. 1 shows a conventional rim 1 with a symmetrical cross-section with respect to the rim center plane M and with symmetrical spoke anchoring in the center of the single rim base 2 as part of a prior art bicycle rear wheel, not shown in its entirety. Such rims are used with the same construction for the front and rear wheels of a cycle. The rim 1 carries a tire 3 whose central position on the rim 1 is ensured by hooks 6 and 7 formed on the rim edges 4 and 5. Sprocket-side spokes 8 connect the rim 1 to the sprocket-side hub flange, not shown, and the sprocket-remote spokes 9 connect the rim to the sprocket-remote hub flange, not shown. As is already known in connection with motorcycles, in place of spoke nipples 10 and 11, the heads of the linear spokes can be anchored in the rim holes 12 after which the spoke nipples are attached in the hub flanges.

When the wheel is centered by rotating the spoke nipples 10, 11, tension forces T1 and T2 are created in spokes 8 and 9 and the ratio thereof is dependent on the ratio of the angles between the spokes 8, 9 on the one hand and the rim center plane M on the other. The resulting horizontal force components P1, P2 are necessarily always the same. The force components S1, S2 acting in the direction toward the wheel axis produce compression stressing of the material of the circular rim 1. The rim center plane M, which passes through the center of the outside width b of the rim, must always be identical to the cycle frame center plane. In the case shown in FIG. 1, it is also identical with the center plane N of the rim holes 12.

The problem with the cycle rear wheel is the significant difference between spoke tensions T1 and T2 on the two wheel sides. Nowadays in racing and sports cycles, the tensions T1 on the sprocket side of the rear wheel are roughly 1.8 times the tensions T2 on the sprocket remote side, which leads to a lack of stability of the rear wheel. There are many reasons for this and they will not be described in detail.

Figure 2:
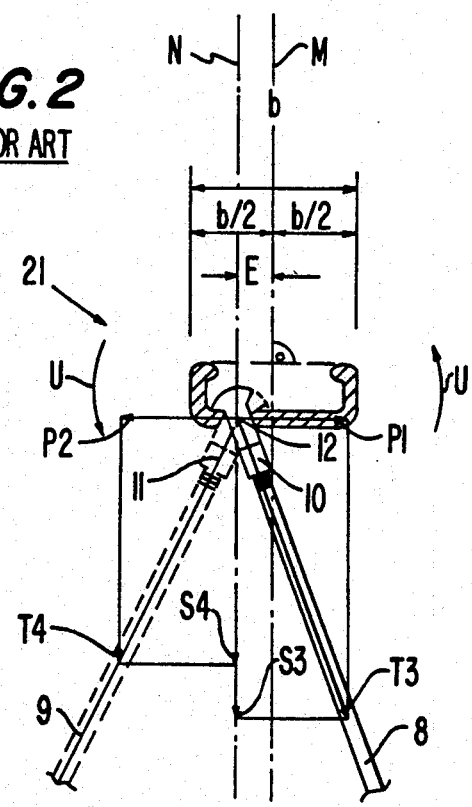
FIG. 2 is a transverse sectional view of the rim of FIG. 1, but with asymmetrical spoke anchoring according to the latest prior art.

FIG. 2 shows a conventional rim 21 with the same symmetrical cross-section as in the rim 1 of FIG. 1, but with asymmetrical spoke anchoring, according to the latest prior art, that is only usable for a cycle rear wheel. The plane N passing through the centers of the rim holes 12 is laterally displaced from the plane of the frame in the direction of the sprocket remote side of the rear wheel and also from the rim center plane M in the rim 21 by the distance E. Spoke nipples 10, 11 have been tightened to such an extent during wheel centering that the horizontal force components P1, P2 of the spoke tensions T3, T4 are the same as with the rim 1 in FIG. 1. However, unlike in FIG. 1, the angle between the spoke 8 and the center plane M on the sprocket side of the wheel is increased and the angle between the spoke 9 and the center plane is decreased. Correspondingly, the spoke tension T3 on the sprocket side has become smaller than the tension T1 in FIG. 1 and T4 has become larger than T2 in FIG. 1. The sought objective has been achieved because the tensions T3 and T4 differ from each other by less than the tensions T1 and T2 in FIG. 1 and the wheel has become more stable. Following the tightening of the spokes 8, 9 the force components S3, S4 which, unlike the rim of FIG. 1, act in a plane spaced from the plane containing the center of the rim cross-section, lead to additional stressing of the rim 21 toward tilting-over as indicated by the arrows U. This displaced arrangement of spoke nipples 10, 11 can only be realized with extremely stiff rims, whereas with the usual weak rim 21 made from inexpensive material, such a solution is impossible.

Figure 3:
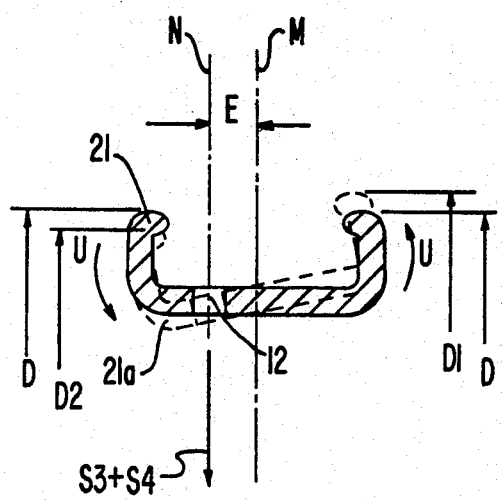
FIG. 3 is an enlarged transverse sectional view of the rim of FIG. 2.

FIG. 3 shows on a larger scale the undesired tilting-over or twisting of rim 21 in direction indicated by the arrows U occurring when centering the wheel. With the prescribed spoke tension, its twisted cross-section reaches the broken line state 21a, which is exaggerated for reasons of representation. The prescribed external diameter D is increased on the sprocket side to the size D1 which can prevent the fitting of the tire, whereas it is decreased on the sprocket remote side to the diameter D2 which could lead to a dangerous jumping of the tire out of the rim. The tilting-over of a rim is particularly marked in connection with lightweight and relatively flexible rims with a simple rim base, with high spoke tensions and high levels of lateral displacement of the rim holes.

Figure 4:
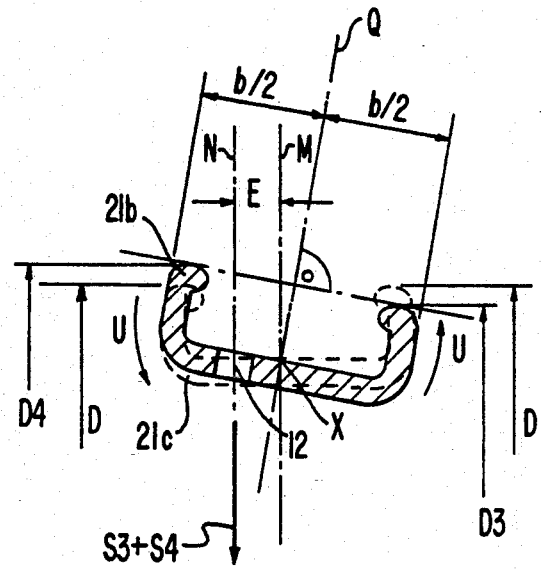
FIG. 4 is an enlarged transverse view similar to FIG. 3 but of a rim according to a first embodiment of the invention.

FIG. 4 shows a rim 21 similar to FIGS. 2 and 3 in the first inventive embodiment. This figure shows how undesired deformation of a rim due to tilting-over can be balanced in that during its manufacture the straight profile rods are circularly bent and their two ends interconnected in such a way that, unlike in FIG. 3, the rim has a slightly conical shape. As a result of this production procedure, the cross-section of the rim 21 in the untensioned state assumes the state shown shaded at 21b so that, on the side closer to the rim holes 12, the rim has a larger external diameter D4 and on the other side a smaller external diameter D3. A cross-sectional axis Q extends at right angles to a line between the radially outermost edges of both rims and intersects the rim base at its center at point X through which also passes the rim center plane M. Although the cross-section of the rim 21 in the state 21b is symmetrical with respect to the cross-sectional axis Q, which is inclined relative to the rim center plane M, due to the conical shape of the rim it is asymmetrical to the rim center plane M. Only after tensioning the spokes in the wheel do the diameters D3, D4 reach the prescribed amount as a result of the action of the force components S3, S4 and consequently the rim cross-section passes from state 21b into the operating state 21c, shown in broken lines, symmetrical with respect to the rim center plane M.

Although the cross-section of the rim 21 in FIG. 3 and the cross-section of the rim in state 21c in FIG. 4 appear the same when initially considered, a major difference exists. Whereas the rim 21 in FIG. 3 shows its state after manufacture, it cannot be operationally used because under the spoke tension it is deformed into the unusable state 21a because of the undesired tilting-over. However, the rim in FIG. 4, manufactured conically in the state 21b, is brought by the operating tension of the spokes and the pre-calculated tilting-over into the operating state 21c and can therefore maintain in operation its prescribed operational dimensions.

Figure 5:
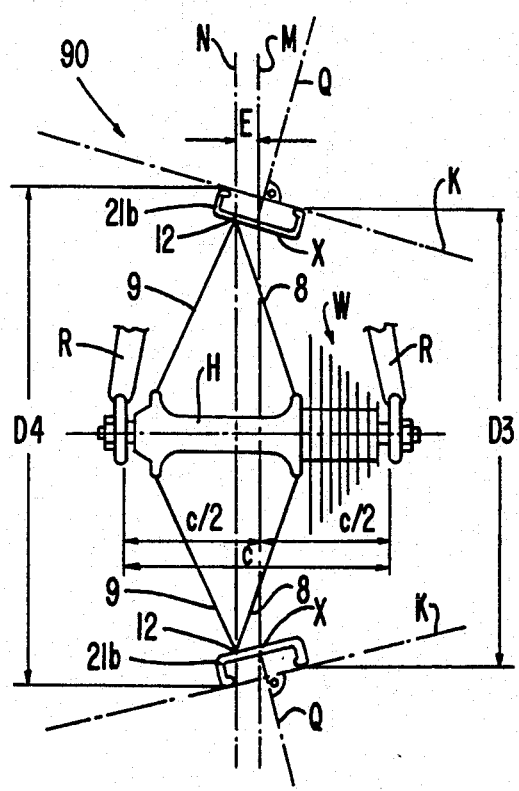
FIG. 5 is a schematic view of a complete, spoked rear wheel at a reduced scale with a rim according to FIG. 4 and having untensioned spokes.
Figure 6:
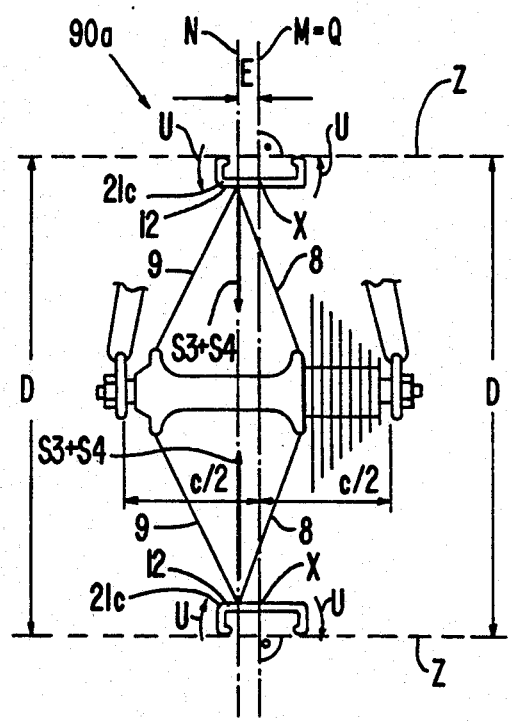
FIG. 6 is a view similar to FIG. 5 but with tensioned spokes.

FIGS. 5 and 6 show the processes of FIG. 4 on a broader scale. FIG. 5 shows in a sectional view a spoked cycle rear wheel 90 without a tire on a smaller scale than in FIG. 4 and prior to the tensioning of the spokes 8, 9. The rear wheel hub H with the sprocket set W is mounted on the cycle frame R and the rim center plane M is identical with the frame center plane as is indicated by c and c/2. The rim 21 with a symmetrical cross-section with respect to the cross-sectional axis Q has been manufactured in the state 21b and the radially outer edges of the rim with the different diameters D3, D4 consequently form an envelope of a cone k. The cross-section of the rim 21 is consequently asymmetrical with respect to the rim center plane M in the state 21b. It is also pointed out that this method of unequal diameters of the rim edges can also be used in the manufacture of the subsequently described rims with an asymmetrical cross-section with respect to the cross-sectional axis Q.

FIG. 6 shows the rear wheel 90 shown in FIG. 5 in the state 90a after the spokes 8, 9 have been tightened to the prescribed tension. The force components S3, S4 of the spoke tensions bring about an intended tilting-over of the rim in the direction indicated by the arrows U from the state 21b shown in FIG. 5 into the new state 21c prescribed for operation. The radially outer rim edges with the same diameters D now form a cylindrical surface z. In the state 21c relative to the rim center plane M, in which now also the cross-sectional axis Q is located, the rim cross-section is symmetrical. Only now is good seating of the tire on the rim ensured. If all the spokes were removed, as a result of the elasticity of its material, the rim 21 would return from the operating state 21c to its original state 21b.

Fundamentally, any rear wheel rim with laterally displaced rim holes in the spoked wheel and with tensioned spokes is subject to a tilting-over stress. This leads to higher pressure in the rim material on that rim side where the rim holes are made than on the other side. However, the good balance of these compressive forces is very important for rim stability. It can be achieved by the shaping of the rim cross-section and/or by different wall thicknesses in the cross-section. This leads to rim cross-sections according to the invention which are asymmetrical with respect to their cross-sectional axes and which can only be used for rims for cycle rear wheels.

FIG. 7 shows an inventive rim 31 with a single rim base 32, whose asymmetrical cross-section relative to the cross-sectional axis Q has a thicker rim edge 33 on the side having the laterally displaced rim holes 12 than on the opposite side with the rim edge 34. This measure reduces the compressive stressing of the rim material on the more loaded side of the rim and consequently makes the rim 31 less sensitive to tilting-over deformation.

FIG. 8 shows an inventive rim 41 with an asymmetrical cross-section with respect to the cross-sectional axis Q and whose single rim base 42 is thicker on the side of the laterally displaced rim holes 12 than on the other side, which also reduces the tilting-over of rim 41. Rim shoulders 43, 44, which replace the hooks on the rim edges, ensure a central position of the tire on the rim and simultaneously make the rim profile stiffer. The measures described in connection with FIGS. 7 and 8 can advantageously be combined.

FIG. 9 shows an inventive rim 51 with laterally displaced rim holes 12 and an asymmetrical cross-section with a double-walled rim base which, from the outside, looks like a prior art symmetrical rim. Its cross-section 51 is formed in such a way that the outer outline 52 of the cross-section passing around the entire cross-section is symmetrical relative to the cross-sectional axis Q. Rim tilting as indicated by the arrows U is opposed by the double rim base and also the increased sectional surface, and therefore the decreased compressive stressing of the rim material on the cross-sectional side containing the rim holes 12. The thickening of the walls of the cross-section 51 is carried out in the area of the rim interior 53 toward the interior of rim cross-section 51, so that the outline 54 of the cross-section of the inner area 53 passing around the cross-section of the latter is asymmetrical relative to the cross-sectional axis Q. The asymmetry of such a rim 51 can consequently only be seen from its cross-section.

FIG. 10 shows a rim 61 according to the invention for touring and sports cycles for cross-country journeys with laterally displaced rim holes 12a, 12b and an asymmetrical cross-section which has a double-walled rim base. Between the radially inner rim base 62 and the radially outer rim base 63, an inner area 64 is formed with a relatively large sectional surface the existence of which significantly increases the rim stiffness. The thickness of rim base 63 is greater on the side of the cross-section with rim holes 12a, 12b than on the opposite side. Rim base 62 is bevelled and its thickness is greater in the vicinity of rim holes 12a, 12b than in the remaining area. The rim edge 65 closest to rim holes 12a, 12b is thicker than the opposite rim edge 66. The described thickening of the two rim bases 62, 63 and rim edge 65 improve the ratio of the compressive forces in the material between the two sides of rim 61 and consequently reduce tilting-over of rim 61 in direction U. However, in practice, all three thickened portions are not necessarily used together in one rim profile. Even without any thickening in the cross-section 61, its asymmetrical shape would act against the tilting-over U of the rim, because on the side of the rim holes 12a, 12b there is greater radial height of the cross-section than on the opposite side and consequently on this side the rim is radially stiffer. The centers of the sprocket-side rim holes 12a and the sprocket-remote rim holes 12b are not located in a single radial plane but are instead alternately laterally displaced by a small amount from the center plane N of the center of all the rim holes. The center plane N is a plane resulting from the average of the spacings of the centers of all the rim holes from the cross-section axis Q. Similar rim hole arrangements are now conventional in most rims with a symmetrical spoke anchoring and lead to advantages and disadvantages which will not be discussed here.

The outer outline 62a of the radially inner rim base 62 is the only part of the entire outer outline of the rim cross-section 61 which is asymmetrical relative to the cross-sectional axis Q. The outer outline 63a of the radially outer rim base 63 should, however, be symmetrical relative to the cross-sectional axis Q to ensure problem-free connection of the rim to the tire. In the manner shown in FIG. 10, the outer outline 65a of the rim edge 65 can be substantially symmetrical to the outer outline 66a of the rim edge 66 relative to the cross-sectional axis Q. The outline 62a formed from three curved portions can be designed in various ways, e.g., from three straight portions or two curved or straight portions and a bend between them in the vicinity of the center plane N, or can be formed from a single arc constituted by several radii. The relatively large width and small height of the rim cross-section 61 and also the linear rim edges 65, 66 parallel to the cross-sectional axis Q for ensuring good braking action of the rim brakes, lead to a marked small radius direction change representing more than 45 radians on the side of the rim edge 66 in the outer outline of the rim cross-section 61 between the rim edges 65, 66 on the one hand and the rim base 62 on the other.

Figure 11:
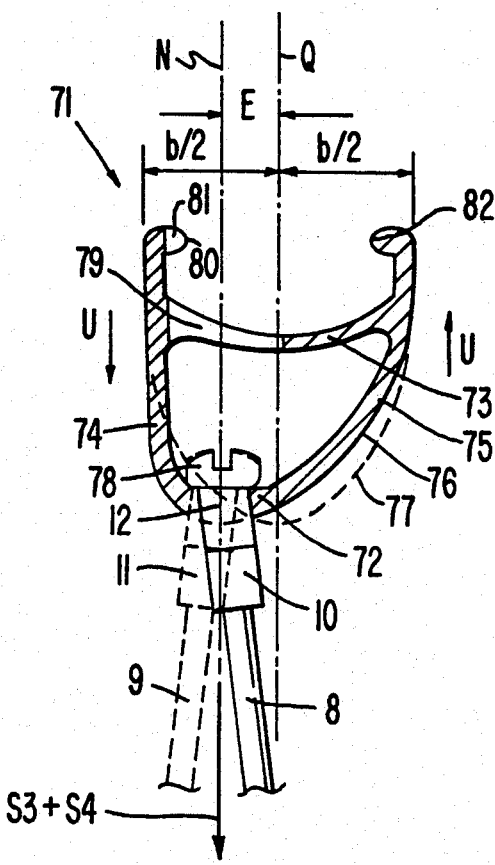

FIG. 11 shows an inventive aerodynamic rim 71 for sports and racing cycles with laterally displaced rim holes 12 and a asymmetrical cross-section with a double rim base. The thickness of the radially outer rim base 73 is greater on the side of the cross-section with the rim holes 12 than on the other side. The very short, radially inner rim base 72, at least at the connecting point with the thicker rim edge 74, is thicker than at the connecting point with the thinner rim edge 75. These thickenings of the cross-sectional walls, which can be used singly and/or to varying extents, bring about greater concentration of the rim material at the more loaded rim side and consequently act against tilting-over of rim 71 in direction U. The marked asymmetrical shape of the rim cross-section 71 has a similar effect because it causes greater radial stiffness of the rim at this more loaded rim side. Both described actions against tilting-over of rim 71 are more effective than with rim 61 in FIG. 10 because the asymmetry of rim 71 is more pronounced.

Unlike the rim 61 in FIG. 10, for aerodynamic reasons, the cross-section 71 has a more triangular shape, is relatively narrow and high and its outer outline 76 is progressive without any marked direction change. As the radially inner rim base 72 is short and both rim edges 74 and 75 are very long, they cannot be symmetrical to one another relative to the cross-sectional axis Q, as is the case with rim 61 in FIG. 10. The outer outline 76 of the entire cross-section 71 is therefore asymmetrical relative to the cross-sectional axis Q in the area from the radially outermost point on one side of cross-section 71 to the radially outermost point on the opposite side of cross-section 71 and is formed from the outer outlines of both rim edges 74, 75 and the radially inner rim base 72. The very pronounced asymmetry of a rim cross-section shown with respect to the aerodynamic rim 71 can be used for aesthetic reasons on rims for other cycle types which have wider and lower cross-sections than the rim 71 and where aerodynamics plays a minor part. For comparison with the asymmetrical rear wheel rim 71, in broken line form is shown a known symmetrical aerodynamic rim 77 which has the same width and height as rim 71 and which is intended for the front wheel of the same bicycle.

In order to be able to insert the spoke nipples in a rim with a double rim base and tighten them with an automatic nipple tightening machine in which a screwdriver engages from the outside in the nipple heads 78 and turns approximately in the plane N, the outer rim holes 79 must have in the radially outer rim base 73 a larger diameter than the nipple heads 78. The undesired amount of dish caused by the sprocket set in a conventional rear wheel is axially roughly 8 mm in modern sports and racing cycles having a set of 7 to 8 sprockets. With the usual narrow rim employed for such cycles, the amount E acting against the dish can only be 2 to 3 mm due to the hook 80, which is in the way of the screwdriver. To increase the amount E in the rotation direction of rim 71, recesses 81 are provided in hook 80 at the locations of the spoke nipples 10, 11, as is also shown in FIG. 12.

Figure 12:
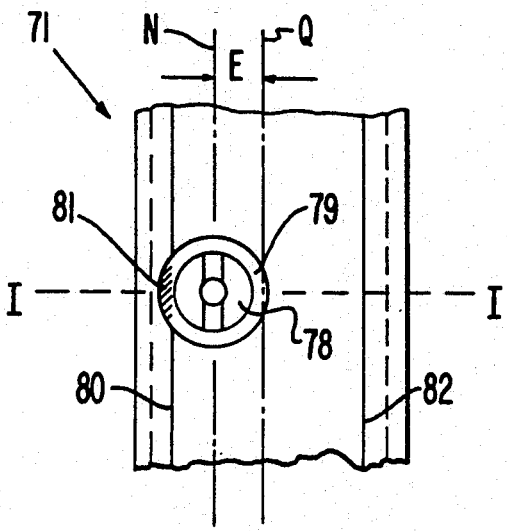
FIG. 12 is a partial plan view of the inside of the rim of FIG. 11 as seen from the wheel axis.

FIG. 12 is a view of rim 71 in the radial direction looking toward the wheel axis. The location of the cross-section of rim 71 of FIG. 11 is indicated by the axial section plane I—I and the recess 81 is shown in hatched form. This recess 81 creates sufficient space for the screwdriver and therefore makes it possible to significantly increase the amount E, e.g., with a 20 mm rim to approximately 4 mm, so that the aforementioned amount of dish of 8 mm can be reduced to half. Recesses 81, mainly provided with narrow rims, can hardly be noticed on a rim with a fitted tire and cycling tests have revealed that there is no possibility of the tire edge jumping out of position below hook 80. As recesses 81 are only provided on the hook 80 locations closest to the spoke nipples 10, 11, whereas the opposite hook 82 is unaffected, no problems occur during tire fitting, because this operation can be carried out from the rim side with the hook 82.

Also in the case of a rim with an asymmetrical cross-section relative to the cross-sectional axis Q, this asymmetry alone, as a function of the rim profile dimensioning, does not in all cases adequately prevent the occurrence of an unacceptably large difference in the diameters of the rim edges because of tilting-over. It can therefore be advantageous to again make the external diameters of the rim edges unequal, as is recommended with symmetrical rims and as is shown relative to the diameters D3, D4 in FIGS. 4 and 5.

Figure 13:
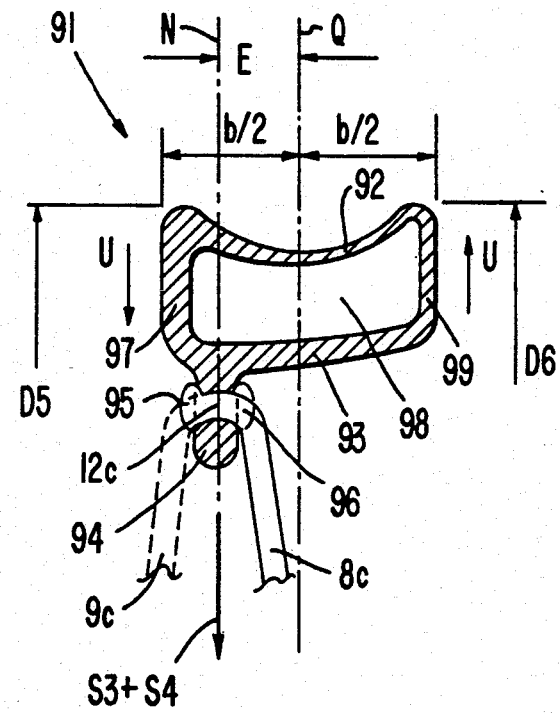
FIG. 13 is a transverse sectional view of a further embodiment of a wheel rim in accordance with the invention with axial spoke holes.

FIG. 13 shows an inventive tubular tire rim 91 for sports and racing with an asymmetrical cross-section, in which the tire (not shown) is adhered to the radially outer rim base 92. The radially inner rim base 93 has a rim flange 94 whose cross-section is similar to that of conventional cycle hub flanges. The center plane of rim flange 94, which is substantially identical to the center plane N of the centers of all the rim holes 12c running in the axial direction, is laterally displaced from the cross-sectional axis Q by the amount E. Spokes 8c, 9c, the ends of which are bent at about right angles, are inserted in inverted manner in the wheel and consequently anchored with spoke heads 95, 96 in axial rim holes 12c, so that the spoke nipples (not shown) are anchored in the formed hub flanges. With motorcycles spoked this way, but with a rim flange in the center of a symmetrical rim, the use of a tubeless tire is made possible because the rim bed does not have any radial holes to be sealed. Instead of using spoke nipples, the tension in spokes 8c, 9c can be produced with other means which are not described here because they do not form part of the present invention. Through special shaping of the rim cross-section 91 and the inverted spoke arrangement in the wheel, there is a considerable increase in the amount E. With a 20 mm rim 91, shown at a scale of about 2:1, the amount E is approximately 6 mm so that the amount of dish of 8 mm conventionally encountered in racing cycles is substantially eliminated and there is almost complete balancing of the spoke tensions on both wheel sides.

The amount E can be further increased in that the rim flange 94 is moved laterally further away from the cross-sectional axis Q, until the outer radial surface of rim flange 94 and rim edge 97 are aligned. The marked tendency of the rim 91 to tilt over in direction U resulting from the large dimensional amount E, must be counteracted by corresponding measures as indicated in FIG. 13 by the increased wall thicknesses of the rim profile on the rim side containing the center plane N of rim holes 12c. In addition, for example, the radial height of the entire cross-section and therefore the sectional surface of the inner area 98 can be increased and/or the cross-section can be made more asymmetrical than shown in FIG. 13. During manufacture the rim can also be shaped in such a way that the external diameter D5 of rim edge 97 on the more loaded rim side is larger than the external diameter D6 of rim edge 99. Only under the planned tensile force of spokes 8c, 9c and the effect of force components S3, S4 in the spoked rear wheel is rim 91 oriented in such a way that the external diameters D5, D6 of the two rim edges 97, 99 reach substantially the same predetermined operating size. If rim 91 is adequately dimensioned by the described and appropriately combined measures, so that its operating dimensions are ensured on a long-term basis, values for the amount E can be obtained which cannot be achieved with rim profiles of the same width, but with spoke nipples anchored in the radial rim holes. Besides good wheel stability, other advantages can be achieved such as the fitting of an additional sprocket. Another advantage of rim 91 is that the radially outer rim base 92 has no outer rim holes with a necessarily large diameter which greatly decrease the rim stiffness such as is always the case with rims having a double rim base and radial rim holes.

The presently conventional rims are made from different materials, have countless cross-sectional shapes and are intended for different tire types. All that is available consists of expensive twisting-stiff carbon rims with a unitary cross-section and symmetrical spoke anchoring for the front wheel and with laterally displaced rim holes for the rear wheel. In time, there will be different types of inventive rims with laterally displaced rim holes for the rear wheel which have some of the features of the present invention and whose cross-section is consequently asymmetrical relative to its center plane. The rim is so shaped and dimensioned that it is so aligned under the intended tensile forces of the spokes, that the external diameters of the two rim edges are substantially the same and the difference in the circumferences of the rim edges does not exceed the permitted divergence from the theoretical size.

The invention is particularly suitable, in combination of the different features, for producing a large number of differently constructed embodiments which are finely graded relative to certain characteristics, or which have specifically planned characteristics. Combination takes place particularly with regard to the different shapes and dimensions of the profiles and/or the shaping or deformation possibilities under the influence of the spoke tensile force. This makes it possible to fulfil all the technical demands made on a rim for a bicycle rear wheel with a set of sprockets.

There are particularly good prospects for rims made from inexpensive light metal alloys in which it is possible to relatively simply and inexpensively produce different asymmetrical profiles with different thickened portions. It is to be hoped that in time an asymmetrical rear wheel rim with laterally displaced spoke anchoring will be more widely acceptable than a symmetrical rim because the asymmetrical shape of the rim cross-section is technically advantageous.

I claim:

1. A rim for a spoked bicycle rear wheel comprising a generally annular rim having an axis, two rim edges and a central plane (M) substantially perpendicular to the axis;
means defining a plurality of spoke anchoring points distributed around said rim for attachment to one end of each of a plurality of spokes the other ends of which are connectable to a wheel hub, said anchoring points having an average axial position defining a second plane (N) axially offset from said central plane;
said rim being shaped and dimensioned such that said rim has
a first cross-sectional configuration before said rim is subjected to tensile forces through spokes attached to said anchoring points in which said rim is asymmetrical relative to said central plane and said rim edges have different external diameters, and
a second cross-sectional configuration after said rim is subjected to said tensile forces in which said rim can be either asymmetrical or symmetrical relative to said central plane and in either case, in said second cross-sectional configuration, said rim edges have substantially the same external diameters.

2. A rim according to claim 1 wherein said rim is symmetrical relative to a rim cross-sectional axis (Q) of said rim and wherein said rim is shaped so that, in said first configuration, on a side containing said second plane (N) said rim has a larger rim edge outer diameter than the rim edge on the other side of said rim cross-sectional axis.

3. A rim according to claim 1 wherein said rim is asymmetrical relative to a rim cross-sectional axis (Q) and has a single-walled rim base extending between said rim edges, said base having a single, substantially radially directed rim hole (12) for each of a plurality of spoke nipples.

4. A rim according to claim 1 and having a rim cross-sectional axis (Q), wherein the cross-section of said rim on one side of said rim cross-sectional axis (Q) containing said plane (N) has a thicker rim edge than the rim edge on the opposite side of said axis (Q).

5. A rim according to claim 1 having a rim cross-sectional axis (Q), wherein the cross-section of said rim on one side of said axis containing a plane (N) has a thicker rim base than the rim base on the opposite side of said axis (Q).

6. A rim according to claim 1 having a cross-section (51, 61, 71) which is asymmetrical relative to a rim cross-sectional axis (Q) and has a double-walled rim base extending between said rim edges with a radially inner wall and a radially outer wall defining a space between said walls, said anchoring points comprising a radially extending hole through each base wall for receiving a spoke nipple having a head, said hole in said radially inner wall being smaller than said nipple head and said hole in said outer wall being larger than said nipple head.

7. A rim according to claim 6 wherein only the outer outline (62a) of said radially inner wall (62) is asymmetrical relative to said cross-sectional axis (Q), the remainder of the outline (65a, 66a) of said cross-section being symmetrical.

8. A rim according to claim 6 wherein an outline of the cross-section of said rim extends without interruption from the radially outermost point of one rim edge to the radially outermost point of the other around said radially inner base wall and is asymmetrical relative to said cross-sectional axis (Q).

9. A rim according to claim 8 wherein a side of said cross-section, as divided by said cross-sectional axis (Q), containing said second plane (N) has thicker wall portions relative to the other side.

10. A rim according to claim 6 wherein said walls defining said space have a greater cross-sectional area on the side of said cross-sectional axis (Q) containing said second plane (N) than on the opposite side of said cross-sectional axis (Q).

11. A rim according to claim 6 wherein the radial height of said cross-section is greater on the side of said cross-sectional axis (Q) containing said second plane (N) than on the opposite side of said cross-section.

12. A rim according to claim 1 wherein
the outer outline of said cross section is symmetrical relative to a rim cross-sectional axis (Q), and has a double-walled rim base extending between said rim edges with a radially inner wall and a radially outer wall defining a space between said walls,
said anchoring points each comprising a radially extending hole through each base wall for receiving a spoke nipple having a head, said hole in said radially inner wall being smaller than said nipple head and said hole in said outer wall being larger than said nipple head,
and wherein portions of said walls of said rim base on the side of said rim cross-sectional axis (Q) containing said second plane (N) are thicker than said walls on the other side of said cross-sectional axis, whereby the periphery of said space between said walls is asymmetrical relative to said cross-sectional axis.

13. A rim according to claim 1 wherein the cross-section of said rim is asymmetrical and, in said first configuration, on the side of a rim cross-sectional axis (Q) containing said second plane (N) said rim has a larger outer diameter than the rim on the other side.

14. A rim according to claim 13 wherein the cross-section of said rim on the side of said rim cross-sectional axis (Q) containing said second plane (N) has a greater area than the opposite side of said cross-section.

15. A rim according to claim 1 wherein each said rim edge includes an inwardly extending hook for engaging a tire mounted on said rim, and wherein said rim edge on the side of said rim having said anchoring points includes means defining a plurality of recesses, each said recess being aligned with one of said anchoring points to facilitate tensioning of spokes connected to said anchoring points.

16. A rim according to claim 1 including a plurality of spokes each having one end bent at a substantially right angle, said rim having an asymmetrical cross-section relative to a rim cross-sectional axis (Q), said rim having a radially inwardly extending flange laterally displaced from said cross-sectional axis (Q) and wherein said anchoring points include means defining a plurality of generally axially extending holes for receiving said bent ends of said spokes.

17. A rim according to claim 1 made from a light metal or a light metal alloy.

18. A rim according to claim 1 and including surface markings on said rim displaying the intended use and manner of use of said rim.

19. A rim for a spoked bicycle rear wheel comprising a generally annular rim having an axis of rotation, two rim edges and a central plane substantially perpendicular to the axis;

means defining a plurality of spoke anchoring points distributed around said rim, each for attachment to an end of one of a plurality of spokes the other ends of which are connectable to a wheel hub, said anchoring points having an average axial position defining a second plane axially offset from said central plane;

said rim having a first portion located on one side of said central plane and including a first set of walls having a first rim edge and said anchoring points;

said rim having a second portion located on the other side of said central plane and including a second set of walls having a second rim edge, said first and second portions being non-symmetrically shaped, said second set of walls having cross-sections smaller than cross-sections of said first set of walls;

said rim having a first cross-sectional configuration before said rim is subjected to tensile forces transmitted through spokes attached to said anchoring points wherein the diameters of said first and second rim edges are substantially equal; and said rim having a second cross-sectional configuration after said rim is subjected to tensile forces transmitted through said spokes attached to said anchoring points wherein the diameters of said first and second rim edges are substantially equal.

* * * * *